United States Patent Office 3,780,195
Patented Dec. 18, 1973

3,780,195
ENCAPSULATION PROCESS
Leslie L. Balassa, Blooming Grove, N.Y., assignor to Balchem Corporation, State Hill, N.Y.
No Drawing. Filed Oct. 22, 1969, Ser. No. 868,637
Int. Cl. A23l 1/26; B01j 13/02; B44d 1/02
U.S. Cl. 426—350
10 Claims

ABSTRACT OF THE DISCLOSURE

A process for encapsulating an active material in a shell composition in which the capsule composition is formed by dispersing an active material and a shell composition in a solvent for the shell composition. Capsules are prepared by forming the capsule composition into particles containing the active material as a dispersed phase in a solution of the shell composition and removing the solvent from the shell composition solution. A lower molecular weight polyglycol is employed to desolventize the shell composition. Removal of solvent is conducted without extracting a substantial proportion of active material from the capsules. If desired, the desolventizing operation can be accelerated by first dispersing the capsule composition in a viscous white mineral oil in which the capsule composition forms discrete particles, and then admixing the resulting mixture with an anhydrous polyglycol containing a sufficient quantity of mutual solvent to render the mineral oil and polyglycol at least partially compatible.

FIELD OF INVENTION

The present invention relates to an encapsulation process. More particularly, the present invention is directed to an improved process for encapsulating active materials in which lower molecular polyglycols are employed to desolventize the capsule composition.

BACKGROUND OF INVENTION

In most microencapsulation processes, one or more materials to be encapsulated, referred to herein as the "active materials," are dispersed in a shell forming composition, referred to herein as the "shell composition." The active material may be finely divided solids, granular solids, liquids, or, in exceptional cases, gases.

The shell composition is either a single material or a combination of materials which is capable of forming an external continuous phase. The active material generally is in the form of an internal discontinuous or dispersed phase. In some cases, the active material may be dissolved in the shell composition without forming a distinct phase within the shell composition.

While it is sometimes possible, or even preferable, to employ the shell composition in a molten state, free of solvents, in most cases the shell composition is dissolved in a volatile or extractable solvent.

A capsule composition is prepared by dispersing the active material and the shell composition in a solvent for the shell composition. The capsule composition is formed into a homogeneous dispersion of sufficient stability to resist stratification during the subsequent steps of capsule formations. The capsule formation steps comprise, broadly, forming the capsule composition into particles and removing the shell composition solvent.

In the formation of capsules, the capsule composition is generally mechanically broken up to form microparticles. Each microparticle contains a proportionate quantity of the active material as a dispersed phase in the shell composition solution. In order to form a solid capsule, the solvent of the shell composition must be substantially removed. Obviously, it is desirable to remove the shell composition solvent with only minimal losses of the active material.

In the past, the mechanical breaking up of the capsule base in the removal of solvent from the shell composition has been accomplished by spray drying. In spray drying, the capsule composition is sprayed into a large volume of air or inert gas at a temperature which is sufficiently high to remove the volatile solvent from the particles by evaporation. It is apparent that in the spray drying process the particles of the capsule composition are exposed to elevated temperatures. Furthermore, unless an inert gas is used, the capsules are in contact with large amounts of oxygen.

The elevated temperatures used in spray drying operations tend to volatilize all or part of the most volatile components of the active material. This is a particularly serious problem when the active material comprises very volatile materials such as flavoring oils. The elevated temperatures of the spray drying process also tend to degrade any heat sensitive active materials. If the capsule composition is sprayed into air, there is the danger of oxidizing any oxidation prone materials.

With respect to compositions containing flammable or explosive solvents, spray drying is hazardous, this necessitating the use of non-flammable solvents in the capsule composition or an inert gas spray drying medium. Either of these expedients cause substantial increase in the cost of the operation, without necessarily overcoming the disadvantages inherent in the spray drying process.

Another disadvantage of spray drying is that shell materials which melt or become tacky at the temperature of the spray drying operation frequently fuse into one solid mass or stick to the inner surfaces of the spray dryer and thus become useless.

Many of the disadvantages of the spray drying technique can be overcome by using a process in which the solvent of the shell composition is removed with an anhydrous alcohol. A capsule composition, in which water is the solvent of the shell composition, may be broken down mechanically into discrete particles by dispersing it with moderate agitation in a suitable liquid. The liquid should be one in which the shell composition is insoluble and which is capable of keeping the particles of the capsule composition from coagulating or coalescing during the subsequent dehydration step. Examples of suitable liquids include mineral oil or vegetable oil. The oil medium may contain an alcohol, such as ethanol, isopropanol, or propanol, to provide partial dehydration simultaneously with capsule formation. Dehydration is completed by a subsequent treatment with an anhydrous alcohol. Such a process is described in copending application Ser. No. 719,816, "Encapsulation of Aroma and Flavors," now U.S. Pat. No. 3,495,988, which application is a continuation-in-part of application Ser. No. 348,325, now abandoned.

This process gives satisfactory results in the encapsulation of the active materials which are insoluble, or only moderately soluble, in alcohol. However, the alcohol, with its low molecular weight, is capable of penetrating many suitable shell materials. The alcohol will than frequently extract, during the dehydration step, a substantial portion of the active material. Active material losses in this manner can easily exceed acceptable limits. Furthermore, the dehydrating alcohol leaves a residual solvent odor in or upon some of the capsule materials. This odor is difficult to remove from the capsules without substantial loss of active materials. The residual solvent odor of materials such as denatured alcohol or isopropanol is, of course, particularly objectionable with respect to encapsulated flavors, aromas, and fragrances.

By following the process of the present invention, it is possible to overcome the disadvantages of the spray drying processes as well as the disadvantages of the oil suspension-low molecular weight alcohol dehydration process.

SUMMARY OF INVENTION

The present invention is directed to a process of encapsulating active material in a shell composition which lower molecular weight polyglycols are used to desolventize the capsule composition particles. In accordance with the present invention, a capsule composition is formed by dispersing an active material and a shell composition in a solvent for the shell composition, the capsule composition is formed into particles containing the active material as a dispersed phase in a solution of the shell composition, and solid capsules are formed by dispersing the capsule composition particles in a lower molecular weight polyglycol whereby the polyglycol acts to desolventize the capsule composition particles.

DETAILED DESCRIPTION OF THE INVENTION

The active materials which may be encapsulated by the process of the present invention may be either liquid or solid materials and may be either soluble or insoluble in the shell composition or the shell composition solvent. The active materials may be food flavors, aromas, fragrances, agricultural chemicals such as insecticides, herbicides, and fertilizers, medicinal compounds, such as vitamins and drugs, etc. Specific examples of suitable active materials include lemon oil, orange oil, pineapple aroma, citric acid, caffeine, ammonium ascorbate, calciumoxide, etc.

The shell material should be a material which is soluble in either water or organic solvents, gellable, and capable of forming substantially air-impervious capsules when desolventized. Suitable water soluble or water dispersible shell materials include hydrophylic polymers such as natural gums (e.g., gum acacia, locust bean gum, gum tragacanth), starches or modified starches (e.g., starch ethers and esters, dextrins, enzyme-treated starches), water-soluble cellulose compounds (e.g., alkali cellulose, cellulose ethers and esters), proteins (e.g., casein, gelatin, soy protein, gluten, egg and blood albumin and their various modifications and alkali derivatives), sugars (e.g., sucrose, glucose, lactose, sorbitol, mannitol), various synthetic materials (e.g., polyvinyl alcohol, polyvinyl pyrrolidone, carboxylated styrene, styrene-maleic acid condensates), etc.

Suitable organic solvent soluble shell materials include cellulose and starch esters and ethers, epoxy resins, polyvinyl resin, alkyd resins, phenol-formaldehyde resins, shellac, dammar resin, asphalt, gilsonite, and numerous other natural and synthetic resins and polymeric materials.

The first step in the encapsulation process of the present invention is the preparation of the shell composition. This generally involves dissolving the shell material in a suitable solvent, for example, dissolving acacia gum in water or an asphalt in carbon tetrachloride. If the active material is soluble in the shell material solvent, the active material may be dissolved in solvent prior to dissolution of the shell material.

In preparing the shell composition solution, it is preferred to use the minimum practical amount of solvent. Sufficient solvent should be used so that the resultant shell composition solution has a viscosity no higher than is practicable to handle with available equipment. It may be necessary to employ solvent concentrations as high as 90% by weight of the shell composition solution with high viscosity shell materials, while concentrations as low as 20% by weight are suitable with very low viscosity shell materials. For example, a shell composition solution of 10% by weight of high viscosity methyl cellulose dissolved in 90% by weight water is suitable, as is a shell composition solution of 80% by weight sorbitol and 20% by weight water.

After the shell composition solution has been prepared, or during the preparation of the solution, antioxidants, preservatives, surfactants, plasticizers, or other modifiers may be added, if desired. The modifiers are mixed with the shell composition solution until a homogenous composition is obtained.

The next step generally is the preparation of the active material for encapsulation (assuming, of course, that the active material was not previously dissolved in the shell material solvent). With most active materials, such as most liquid active materials, no preparatory treatment is needed. With solid materials it may be first necessary to treat them to obtain particles of the desired size. In some instances it is also desirable to pre-coat the solid materials prior to encapsulation. If the active material is a mixture of more than one compound, it is necessary to first mix the various ingredients.

The capsule composition is formed by dispersing the active material and the shell material in the shell composition solvent. Usually, the active material is dispersed in a solution of shell composition. However, in some instances, such as when the active material is soluble in the solvent, the active material may be added to the solvent first, or the active material and the shell composition may be added simultaneously. The dispersion of the active material may be accomplished by any suitable means such as by a closed turbine high shear mixer or by a pressure homogenizer. The term "dispersion," as used herein, refers to either a solution or a homogeneous mixture of discrete particles distributed throughout the solvent.

The concentration of the active ingredients used in the capsules is governed by the performance requirements of the capsules. In general, for reasons of economy it is desirable to use the maximum amount of active material in the capsule which will meet performance requirements. In some cases, to meet certain dosage requirements, the amount of active material incorporated into the capsule may be 1% or less by weight of the capsule. To control taste characteristics, it may be necessary to employ less active material than could otherwise be employed. In other instances, taste characteristics may be controlled by coating the capsules with one or two percent by weight of aluminum stearate.

The fluid or paste-like capsule composition is introduced into an anhydrous polyglycol under conditions which provide for a breakup of the capsule composition into small discrete liquid particles. These particles are preferably kept in constant motion for a sufficient length of time for the solvent to be extracted from the particles by the polyglycol and to harden or set the particles into capsules. The breakup of the capsule composition into discrete liquid particles may be accomplished by numerous methods, such as rapid agitation with a turbine mixer.

The desolventized solid capsules may be separated from the polyglycol by filtering or centrifuging.

The amount of polyglycol used to desolventize the capsule composition can be varied over a relatively large range. The amount of polyglycol employed is somewhat dependent upon the amount of solvent to be extracted and the volume of the capsule composition. It is necessary to employ a sufficient amount of polyglycol to (1) assure extraction of the solvent within a reasonable period of time, and (2) allow free movement of the capsule composition at all stages of solvent extraction. These conditions are generally adequately satisfied if ratios by weight of capsule composition to polyglycol of between 1:5 and 1:30 are employed. Preferably a ratio of ten parts by weight polyglycol to one part by weight capsule composition is employed in the solvent extraction step.

The water or organic solvent extraction of the capsules may be carried out at any temperature between the freezing point and the boiling point of the polyglycol employed. When encapsulating volatile materials or materials which are degraded or decomposed at elevated temperatures, the capsule composition is prepared at as low a temperature as is feasible and the polyglycol is employed at a temperature at or just above its freezing point. If the active material is not heat-sensitive, then the desolventizing of the capsule may be carried out at higher temperatures. Those skilled in the art may readily determine the optimum temperature of operation consistent with the properties of the active material and the polyglycol.

If desired, the desolventizing operation may be carried out under vacuum or while passing air or other gases through the polyglycol-capsule composition mixture to sweep solvents from the polyglycol.

Polyglycols suitable for use with the present invention include those having molecular weights in the range of about 106 (diethylene glycol) to about 2,000. Polyglycols within the upper end of this molecular weight range are not desirable for desolventizing aqueous capsule compositions (dehydrating), but are suitable for desolventizing capsule compositions in which an organic solvent is employed. Preferred desolventizing materials are polyglycols having molecular weights within the range of about 190 to about 785. Particularly preferred are polyethylene glycols with the generalized formula

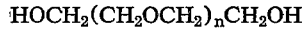

$$HOCH_2(CH_2OCH_2)_nCH_2OH$$

(in which $n$ represents the average number of oxyethylene groups) having average molecular weights ranging from 190 to 630 (available commercially as Carbowax polyethylene glycols). Also preferred are methoxy polyethylene glycol having molecular weights in the range of 335 to 785 (available commercially as Carbowax methoxy polyethylene glycols). Diverse other polyglycols such as polypropylene, polybutylene, and polystyrene glycols and their combinations, may also be employed.

Polyglycols in the average molecular weght ranges of about 106 to about 2,000 are viscous, hygroscopic liquids compatible with a large number of organic solvents which are useful in the preparation of capsule shell composition solutions. The viscosity of the polyglycols, combined with their physical structure and lubricity, makes possible the formation of dispersed capsule slurries in which the capsules will not coalesce while the polyglycols dehydrate or desolventize the capsule particles.

An outstanding property of polyglycols is that they are incompatible with, or at least they are not solvents for, many of the materials commonly used for capsule shell compositions. Furthermore, the comparatively large glycol molecules do not penetrate beyond the surface of most of the capsule shells and therefore the major portion of the active material contained in the capsule composition remains within the confines of the capsule, protected by the shell, while the low molecular weight solvents are extracted from the shell. The shell material, acting as a semi-permeable membrane, allows the low molecular weight solvents to diffuse through it, while the larger molecules of the active material are retained.

After recovery of the desolventized capsules from the polyglycol, the polyglycol adhering to the capsules may be removed by washing with a suitable material, such as a suitable organic solvent or with water if the shell material is water insoluble.

In some cases, such as in the encapsulation of food flavors, aromas, and fragrances, it may be advantageous to allow a film of polyglycol to remain on the capsule. The film acts as a barrier to oxygen penetration. Since properly prepared polyglycols are tasteless, odor-free, and non-toxic, they are considered to be suitable for use with food and food additives.

The polyglycol used in the desolventizing of the capsules may contain various additives. These additives may be designed to protect the capsules or the active materials within the capsules or to obtain special effects more conveniently or more effectively than can be obtained by incorporating the materials into the capsules. Examples of various materials which may be added to the polyglycol include antioxidants, fungicides, bactericides, dyes, pigments, etc.

Materials such as colloidal silica, starch, talc, and other absorbent or lubricating materials may also be applied to the surface of the capsule in order to achieve a drier and more free-flowing surface.

The desolventizing operation can be accelerated by first dispersing the capsule composition in a viscous white mineral oil in which the capsule composition forms discrete particles. The mineral oil-capsule composition mixture is admixed with an anhydrous polyglycol containing a sufficient quantity of a mutual solvent for the mineral oil and the polyglycol to render the mineral oil and the polyglycol at least partially compatible.

The following examples are given to further illustrate the invention; they are merely exemplary and are in no way limiting.

Example 1 (preparation of lemon oil capsules)

(A) Preparation of the shell composition and solution.—Five hundred grams of water were heated to boil and 500 grams dextrin (National Starch and Chemical Corporation, 78–1523) was added with rapid and efficient mixing, using a closed turbine, high shear mixer (Barrington Converti Jet Model CJ–5B). Mixing was continued until a homogeneous solution was obtained.

(B) Preparation of lemon oil capsule composition.—Eighty-one grams of lemon oil (California cold pressed oil) was emulsified in 300 grams of the shell composition solution (A) by means of a homogenizing mixer (Barrington Converti Jet Model CP–5B operated as a closed turbine unit). At the start of the operation the temperature of the shell composition solution was 20° C. and of the lemon oil 15° C. The mixing vessel was cooled during the operation of the mixer in order to prevent a rise in the temperature and to keep the temperature below 25° C.

(C) Capsule formation and dehydration.—One thousand grams of polyethylene glycol having an average molecular weight of 400 (Union Carbide Corporation, Carbowax 400) and at a temperature of about 25° C. was placed in a vessel equipped with a homogenizing mixer (Barrington Converti Jet Model CJ–5B operated as an open turbine unit). One hundred grams of the lemon oil capsule composition (B) was introducted into the polyethylene glycol in a thin stream with steady medium speed operation of the mixer (about 1,500 r.p.m. shaft speed. By the action of the mixer, the lemon oil emulsion was broken up into coarse liquid particles, which, in contact with the polyethylene glycol, were rapidly converted into gel particles and finally into virtually anhydrous capsule granules.

The capsule granules were separated from the excess polyethylene glycol by means of a basket centrifuge.

The dry capsules contained 25% by weight lemon oil and about 20% by weight polyethylene glycol adsorbed on the surface. The capsules dissolved rapidly in cold water and had the natural fresh flavor of the original lemon oil. The capsules retained their fresh flavor even after extended storage in the presence of air.

The lemon oil retained in the capsules was found to be about 90% by weight of the total oil used. In calculating the oil retained and the oil content of the capsules, the adhering polyethylene glycol was considered as part of the capsule weight.

Example 2

The procedure of Example 1 was followed except that the capsules, after dehydration with polyethylene glycol, were washed in the centrifuge with anhydrous ethanol to remove the polyethylene glycol adhering to the capsules.

The properties of the capsules obtained were very similar to those obtained in Example 1. The oil content of the capsules was 31.5% by weight corresponding with an oil recovery of 90% of that used.

Example 3

The procedure of Example 1 was repeated except that during Step (B) (Preparation of lemon oil capsule composition), the lemon oil content of the emulsion was increased to a ratio of 45% by weight lemon oil to 55% by weight shell composition (solids). The resultant capsules were very similar to those of the capsules of Example 1 but exhibited an increase in the oil content. The oil recovered was about 85% by weight of that used.

Example 4

Example 1 was repeated, except that the polyethylene glycol employed was replaced with one having an average molecular weight of 600 (Union Carbide Corp., Carbowax 600). The capsules obtained and the yields were virtually identical with those of Example 1.

Example 5 (preparation of lemon oil capsules)

(A) Preparation of the shell composition solution.—The shell composition was prepared by mixing 40 grams sodium caseinate (Sheffield Chemical Company, Sheftene), 400 grams of dextrin (Corn Products Co., Mor-Re P–932 "hydrolyzed cereal solids") and 90 grams sorbitol into 470 grams of distilled water using a closed-turbine mixer. Mixing was continued until a homogeneous solution was obtained. The pH of the resultant composition was 7.8.

Steps (B) and (C) of Example 1 were repeated, using the shell composition solution of this example. The properties of the capsules obtained were substantially the same as those of Example 1 with the exception that the capsules of this example were not completely soluble in aqueous citric acid.

Example 6

Example 5 was repeated except that the sorbitol was replaced by a corresponding increase in dextrin.

Capsules obtained had properties very similar to those of Example 5, but exhibited less of a tendency to stick together when exposed to an atmosphere of high moisture content.

Example 7 (preparation of orange oil capsules)

Example 1 was repeated except that the lemon oil was replaced by cold pressed orange oil. The capsules obtained had properties essentially the same as the corresponding lemon oil capsules.

Example 8 (pineapple aroma capsules)

(A) Preparation of the capsule composition.—This example illustrates the use of the process of the present invention with an active material which is soluble in the shell composition solvent. Four hundred grams of dextrin (Corn Products Co., Mor-Rex P–932) was dissolved in a 1% by weight aqueous pineapple aroma solution at a temperature of 23° C. The mixture was rapidly mixed, using a closed-turbine mixer.

(B) Capsule formation and dehydration.—One thousand grams of polyethylene glycol (Union Carbide Corp., Carbowax 600) was placed in a vessel equipped with a variable-speed open-turbine mixer. One hundred grams of the pineapple aroma capsule composition (A) was introduced into the polyethylene glycol in a thin stream with steady medium speed operation of the mixer. By action of the mixer the capsule composition was broken up into coarse liquid particles which, in contact with the polyethylene glycol, were rapidly converted into gel particles and finally into virtually anhydrous capsule granules.

The capsule granules were separated from the polyethylene glycol by means of a basket centrifuge and the resultant capsules were washed with anhydrous ethanol to remove polyethylene glycol adhering to the capsules.

Example 9 (citric acid capsules)

With rapid mixing, 25 grams of citric acid was added to 100 grams of the shell composition solution (A) of Example 1. Mixing was continued until a homogeneous solution was obtained. This solution was then added to 1,000 grams of anhydrous polyethylene glycol (Union Carbide Corp., Carbowax 600) with rapid mixing, using an open-turbine mixer. The mixing was continued for about 30 minutes until the dehydration of the capsules was completed. The dehydrated capsules were separated from the polyglycol by centrifuging.

The dehydrated capsules had a strong citric acid taste, were rapidly soluble in water, and were less hygroscopic than the unencapsulated citric acid.

Example 10 (lemon oil capsules)

(A) Preparation of the shell composition solution.—One hundred grams of sodium caseinate was dispersed in 500 grams of distilled water at room temperature (20° C.) using a high-shear turbine mixer. The temperature of the solution was then raised to about 90° C. with the mixing vessel in a water bath. With constant mixing, 398 grams of dextrin was added, followed by 2 grams of stearic acid. Mixing was continued until a homogeneous solution was obtained. The material was then cooled to 25° C. The pH of this capsule composition solution was 8.5.

(B) Preparation of lemon oil capsule composition.—Step (B) of Example 1 was repeated using the shell composition solution (A) of this example.

(C) Capsule formation and dehydration.—One thousand grams of polyethylene glycol (Carbowax 400) containing 1% by weight citric acid dissolved therein was placed in a vessel equipped with a variable-speed, open-turbine mixer. One hundred grams of the lemon oil capsule composition (B) was introduced into the polyethylene glycol in a thin stream with steady medium speed operation of the mixer. By the action of the mixing, the lemon oil emulsion was broken up into coarse liquid particles which, in contact with polyethylene glycol, were converted into virtually anhydrous capsule granules. The citric acid functioned to neutralize the sodium of the sodium caseinate in the surface layers of the capsules and thereby reduced the water solubility of the capsules.

After recovery of the capsule granules from the polyglycol by means of a basket centrifuge, the capsules were found to be largely insoluble in cold water. When incorporated into a cake mix, the capsules released the lemon oil only slowly during baking.

It was found that even a slower release of the flavor oil could be obtained when 2 to 3% by weight of acetaldehyde was added to the flavoring oil in step (B) before the emulsion was formed.

Example 11 (caffeine capsules)

(A) Preparation of the capsule composition.—Fifty grams of caffeine (U.S.P. grade) were dispersed in 300 grams of distilled water at ambient temperature. With constant mixing, using a closed-turbine mixer, 100 grams of caseine were added gradually. The temperature of the mixture was raised on a water bath to 95° C. and one gram of ammonia (in the form of a 30% ammonium hydroxide solution) was added. Mixing was continued until a homogeneous product was obtained.

(B) Capsule formation and dehydration.—With rapid mixing, 100 grams of the capsule composition (A) at a temperature of 85° C. was introduced into 1,000 grams of polyethylene glycol (Carbowax 600) at a temperature of 23° C. Mixing was continued for about 30 minutes to complete dehydration of the capsules formed. The capsules were recovered by centrifuging.

The dehydrated capsules had only a slight caffeine taste when held on the tongue.

Example 12 (caffeine capsules)

Example 11 was repeated, except that the capsule composition contained 64.5% by weight distilled water, 10.7% by weight caffeine, 21.5% by weight caseine, 3.0% by weight stearic acid, and 0.3% ammonia. After dehydration, the capsules were washed in the centrifuge with a 2% by weight stearic acid solution in ethylene chloride until the polyethylene glycol was stripped from the surface of the capsules and replaced by a thin film of stearic acid.

The resultant capsules had no distinguishable taste in the mouth unless they were broken by chewing.

Example 13 (ascorbate capsules)

(A) Preparation of the shell composition solution.—Two hundred grams of ammonium caseinate were dispersed in 800 grams of distilled water at ambient temperature. The temperature of the dispersion was raised to 85° C. to effect the solution of the ammonium caseinate.

(B) Preparation of the capsule composition.—One hundred grams of the shell composition solution was heated to a temperature of 55° C. and 2 grams of stearic acid were added. Ten grams of ascorbic acid (U.S.P. Grade) and 4 grams of ammonium hydroxide (in the form of a 30% solution) were pre-mixed and the resultant ammonium ascorbate containing solution was added to the warm stearic acid-shell composition solution mixture. Mixing was continued until a homogeneous mixture was obtained.

(C) Capsule formation and dehydration.—While slowly agitating, 100 grams of the capsule composition of Step (B), at a temperature of 30° C., was added to 500 grams of white mineral oil (Saybolt Universal Viscosity 340/365 at 37.8° C.) having a temperature of 20° C. Agitation was continued until the capsule composition was broken up into small globules suspended in the mineral oil.

The mineral oil suspension of the capsule composition was added with rapid mixing to a mixture of 1,000 grams of polyethylene glycol (Carbowax 400) and 1,000 grams of carbon tetrachloride. Mixing was continued until the capsules were dehydrated (about 45 minutes).

The dehydrated capsules were separated from the liquids by centrifugal separation and washed in the centrifuge bowl with a 2% by weight stearic acid solution in carbon tetrachloride. The washed capsules were stripped of the solvent in a nitrogen atmosphere at a reduced pressure. The capsules were then coated with a 20% by weight stearic acid in carbon tetrachloride solution and the carbon tetrachloride was evaporated in a nitrogen atmosphere.

The spherical capsules obtained were found to protect the active material on storage.

Example 14.—(calcium oxide capsules)

(A) Preparation of the shell composition solution.—With constant mixing, at a temperature of about 50° C., 400 grams of gilsonite (Ziegler Chemical and Mineral Company, Zeco 11–A Selects) was dissolved in 600 grams of trichlorethylene.

(B) Preparation of calcium oxide.—Six grams of iron distearate (Witco Chemical Corporation, EC-8323) was dissolved in 94 grams of trichlorethylene. One hundred grams of calcium oxide (about 100 mesh) was placed in a hand mortar and the iron distearate solution was added in increments. Under a current of warm air (to facilitate the evaporation of the trichlorethylene) the resultant mixture was constantly mixed and mulled. When most of the solvent was evaporated and the mass became powdery, the powder was placed on metal foil in an oven at 100° C. and kept at this temperature for 30 minutes.

By surface treating the calcium oxide with iron distearate, the surface tension between the shell composition and the calcium oxide is reduced.

(C) Preparation of the capsule composition.—Three grams of iron distearate were dissolved in 735 grams of the shell composition solution (A). One hundred and seventy-eight grams of the treated calcium oxide (B) was pre-wet with 84 grams of trichlorethylene and then dispersed in the shell composition solution, using a high-speed closed-turbine mixer. The mixing raised the temperature of the materials to 60° C.

(D) Capsule formation and solvent extraction.—Seven hundred grams of the capsule composition (C), having a temperature of 50° C., was introduced in a thin stream into 3,500 grams of polyethylene glycol (Carbowax 400) and rapidly mixed with an open turbine mixer. At the start of the mixing operation the temperature of the polyglycol was 20° C.; at the completion of capsule formation it was 26° C. Mixing was continued for two hours at reduced speed in order to extract the major part of the solvent from the capsule.

Capsules were recovered from the polyglycol and washed with ethyl alcohol to free them from adhering polyglycol. The resultant capsules had an estimated particle size in the range of about 40 to about 300 microns.

The capsules were tested in water for the rate of release of the encapsulated calcium oxide. At temperatures up to boiling, only the calcium oxide from the surface layers of the capsules was released. In boiling water, the calcium oxide was released only at a very slow rate.

What is claimed is:

1. A process for encapsulating an encapsulatable active material without extracting a substantial proportion of the active material during extraction of the solvent, comprising the steps of:
    (a) distributing said active material and a shell-forming component in a liquid which is a solvent for said shell-forming component, to provide a capsule composition;
    (b) forming said capsule composition into small discrete liquid particles containing said active material as a dispersed phase, and
    (c) transforming said liquid capsule composition particles into solid capsules by dispersing said particles in an anhydrous liquid polyglycol having an average molecular weight between about 106 and about 2000 and maintaining said particles in contact with said polyglycol for a sufficient period of time to substantially extract the solvent from said particles and simultaneously to harden said particles into solid capsules, the weight ratio of capsule composition to polyglycol being between about 1:5 and about 1:30.

2. The process of claim 1 in which the extraction in step (c) is carried out at temperature between the freezing point and the boiling point of the glycol.

3. The process of claim 1 which includes the further step of separating the solid capsules from the polyglycol.

4. The process of claim 1 in which the polyglycol is a polyethylene glycol having a molecular weight between about 190 and about 630.

5. The process of claim 1 in which said active material is selected from the group consisting of a flavor, a fragrance, a medicament, a vitamin, a fertilizer, a pesticide, and lime.

6. The process of claim 1 in which said shell-forming component is selected from the group consisting of a natural gum, a starch, a starch ether, a starch ester, enzyme-treated starch, a dextrin, a protein, a sugar, a synthetic resin, gilsonite, and asphalt.

7. The process of claim 1 in which the active material is lemon oil.

8. The process of claim 1 in which the solvent is water.

9. The process of claim 1 in which the solvent is an organic solvent.

10. A process for encapsulating an encapsulatable active material, comprising the steps of:
   (a) distributing said active material and a shell-forming component in a liquid which is a solvent for said shell-forming component, to provide a capsule composition;
   (b) forming said capsule composition into small discrete liquid particles containing said active material as a dispersed phase by dispersing the capsule composition in a viscous white mineral oil; and,
   (c) transforming said liquid capsule composition particles into solid capsules by dispersing said particles in an anhydrous liquid polyglycol having an average molecular weight between about 106 and about 2000 containing a sufficient quantity of a mutual solvent for said mineral oil and said polyglycol to render said mineral oil and said polyglycol at least partially compatible, and maintaining said particles in contact with said polyglycol for a sufficient period of time to substantially extract the solvent from said particles and simultaneously to harden said particles into solid capsules, the weight ratio of capsule composition to polyglycol being between about 1:5 and about 1:30.

References Cited

UNITED STATES PATENTS

| | | | |
|---|---|---|---|
| 2,572,744 | 10/1951 | Mollring | 117—100 X |
| 2,686,807 | 8/1954 | Nadler | 117—100 X |
| 2,828,206 | 3/1958 | Rosenberg | 424—35 X |
| 3,043,782 | 7/1962 | Jensen | 252—316 |
| 3,082,154 | 3/1963 | Allan | 424—34 X |
| 3,139,383 | 6/1964 | Neville, Jr. | 424—35 X |
| 3,159,585 | 12/1964 | Evans et al. | 252—316 |
| 3,265,629 | 8/1966 | Jensen | 252—316 |
| 3,516,942 | 6/1970 | Scarpelli | 252—316 |
| 3,516,943 | 6/1970 | Brynko et al. | 252—316 |

OTHER REFERENCES

Kirk-Othmer, Encyclopedia of Chemical Technology, vol. 10, John Wiley & Sons, Inc., New York (1966), pp. 652 and 653.

Kirk-Othmer, Encyclopedia of Chemical Technology, vol. 13, John Wiley & Sons, Inc., New York (1967), pp. 445 and 446.

RICHARD D. LOVERING, Primary Examiner

U.S. Cl. X.R.

71—64 F; 117—81, 100 A; 252—316, 522; 264—4; 424—32, 33, 34, 35, 36, 37, 38, 253, 280